United States Patent [19]

Kataoka et al.

[11] Patent Number: 5,177,422
[45] Date of Patent: Jan. 5, 1993

[54] RECORDING CONTROL SYSTEM FOR A RECORDING APPARATUS

[75] Inventors: Junnosuke Kataoka; Masahiro Sakamoto, both of Tokyo, Japan

[73] Assignee: Canon Kabushiki Kaisha, Tokyo, Japan

[21] Appl. No.: 558,437

[22] Filed: Jul. 27, 1990

[30] Foreign Application Priority Data

Jul. 31, 1989 [JP] Japan ................ 1-196780

[51] Int. Cl.⁵ .................................. H02P 8/00
[52] U.S. Cl. .................... 318/696; 318/685; 346/76 PH; 400/120
[58] Field of Search ............... 318/696, 685; 346/76 PH; 400/120

[56] References Cited

U.S. PATENT DOCUMENTS

| 4,224,869 | 9/1980 | Morin ............................ 400/120 X |
| 4,340,848 | 7/1982 | Hanagata et al. .................. 318/561 |
| 4,638,332 | 1/1987 | Sakura et al. ................. 346/76 PH |
| 4,658,302 | 4/1987 | Sakamoto ........................ 358/496 |
| 4,663,672 | 5/1987 | Sakamoto ........................ 358/409 |
| 4,707,706 | 11/1987 | Nagano ........................ 346/76 PH |
| 4,899,171 | 2/1990 | Ogura et al. .................. 346/76 PH |

Primary Examiner—William M. Shoop, Jr.
Assistant Examiner—Karen Masih
Attorney, Agent, or Firm—Fitzpatrick, Cella, Harper & Scinto

[57] ABSTRACT

The present invention relates to control of motor and strobe pulses in a printer which feeds a paper by a stepping motor and prints data by strobe pulses. A uniform record line density is attained by non-linearly changing currents and interval of phase excitation pulses for trigger of the motor and timing of the strobe pulses.

9 Claims, 4 Drawing Sheets

RECORDING CONTROL SYSTEM FOR A RECORDING APPARATUS

BACKGROUND OF THE INVENTION

1. Field of the Invention

The present invention relates to a recording control system for a recording apparatus such as a facsimile machine, and more particularly to a recording control system for a recorder which attains a uniform record line density when a sheet is fed by a stepping motor.

2. Related Background Art

When a stepping motor is driven intermittently at a rotation speed of 800 pps, for example, a pulse rate is increased at the start of drive of the motor from 400 pps to 600 pps and then to 800 pps to attain acceleration control, or conversely the motor is decelerated to stop.

Such a motor control system is, disclosed in U.S. Pat. No. 4340848. Such a control is appropriate for a drive control for driving the motor at a high speed for a relatively long period at a constant time interval such as the feed of a record sheet or transport of a carriage in a conventional printer. However, in paper feed drive in a facsimile machine in which the motor is driven intermittently and at non-constant period and the number of steps per drive is as small as four or eight steps, full acceleration and deceleration are not attained and extra time is required for the acceleration or the deceleration.

The assignee of the present invention has proposed in the U.S. patent application Ser. No. 372,822 to measure an interval of drive triggers for the stepping motor and control a phase excitation energy or a phase excitation time in accordance with the interval so that the rotation of the stepping motor is smoothened.

However, even in a facsimile machine which uses such a stepping motor drive system, it is not fully attained to keep a record line density of the recorder uniform or constant.

In the prior art recorder, a plurality of strobe signals are successively sent to a thermal recording head of the facsimile machine simultaneously with the sending of the trigger to the stepping motor. A plurality of excitation pulses and strobe signals are generated for each trigger pulse in order to rotate the motor as smoothly as possible. In the prior art recorder, the trigger signal is in synchronism with the excitation pulses or the strobe signals and a linear control is usually made. Assuming that the phase excitation is to be advanced by four steps for each motor trigger, the four phase excitation currents of the motor are equal and the intervals are also equal as shown in FIG. 5. The intervals of strobing are also equal accordingly.

A rotor of the motor has an inertia which increases further when the motor is loaded. Accordingly, in actuality, the rotation angle of the motor tends to be delayed with respect to the excitation signal at the beginning. When the motor is to be stopped, the inertia acts reversely so that it tends to overshoot. FIG. 5 shows the movement. A broken line shows an ideal case of the motor rotation. As shown in FIG. 5, during the generation of the strobe signals, that is, during the dot recording, the amount of paper feed is not uniform along the direction of paper feed. As a result, the record line density is not constant and a record quality is poor. When a time period $T_2$ from the fourth excitation pulse to the next trigger pulse is sufficiently long, the motor has been stopped when the next trigger pulse is applied. As a result, the paper movement is again ununiform as shown in FIG. 5.

SUMMARY OF THE INVENTION

It is an object of the present invention to solve the above problems and keep the record line density constant or uniform.

It is another object of the present invention to shorten an interval of pulse generation of excitation pulses for a stepping motor more for those excitation pulses which are closer to the start timing.

It is other object of the present invention to set a delay time from the first excitation pulse applied to the motor to the first dot recording along the paper feed direction longer as a time period from the end of the previous excitation for the stepping motor to the next excitation is longer.

DESCRIPTION OF THE PREFERRED EMBODIMENTS

One embodiment of the present invention is now explained with reference to the drawings.

Figure 1:
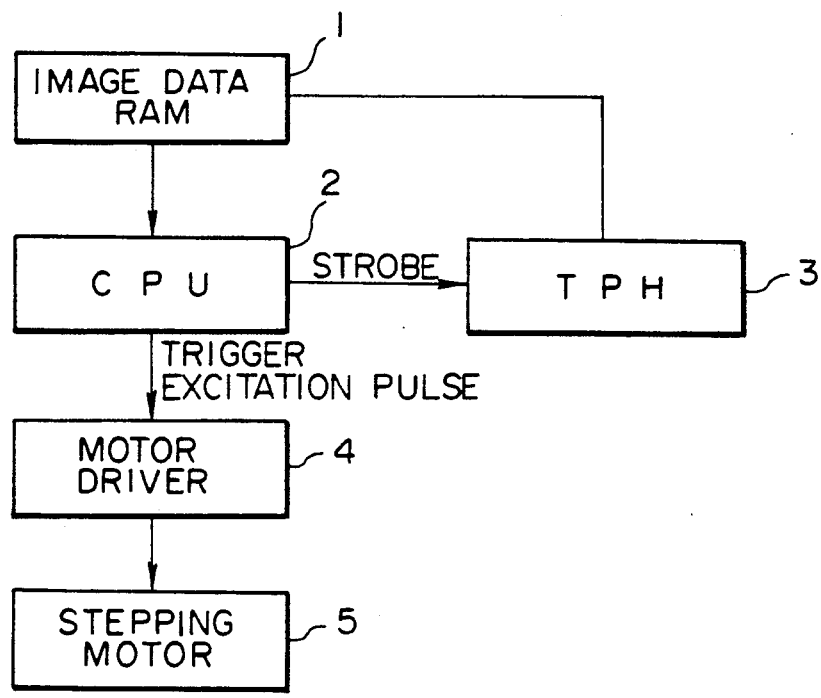
FIG. 1 shows a recording control block diagram of a recorder in accordance with one embodiment of the present invention.
Figure 2:
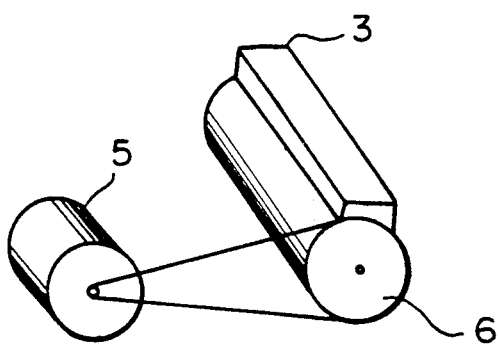
FIG. 2 shows a relationship between a motor and a head shown in FIG. 1.

FIG. 1 shows a control block diagram of a recorder having a thermal print head. Numeral 1 denotes a RAM for storing image data, numeral 2 denotes a CPU, numeral 3 denotes a thermal print head (TPH), numeral 4 denotes a motor driver and numeral 5 denotes a stepping motor which drives a platen 6 to feed a sheet as shown in FIG. 2. The thermal head 3 is mounted on the platen 6 to record data on a record sheet which is fed in.

In the above arrangement, the CPU 2 controls the timing of strobe pulses to be supplied to the TPH 3 in accordance with the interval of the image data and also controls a phase excitation timing and a current of the motor driver 4.

The control of the excitation timing and the current by the CPU 2 is now explained. For the simplification of the description, it is assumed that the phase excitation is advanced by four steps for each motor trigger.

Figure 3:
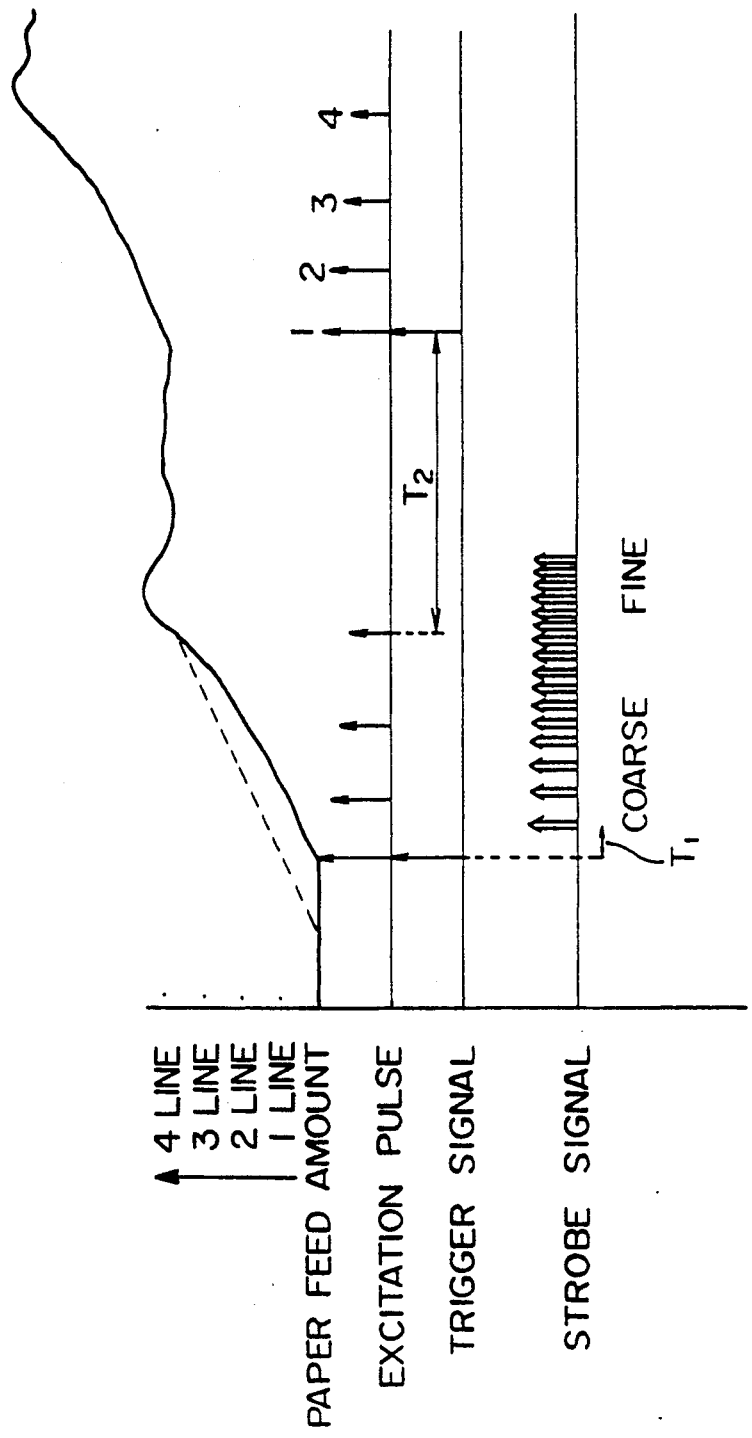
FIG. 3 shows a timing chart for elements shown in FIG. 1.

The characteristics of the control shown in FIG. 3 are (1) Currents of the four excitation pulses are gradually decreased.

(2) The interval between the excitation pulses is short for the interval between first-to-second pulses normal for the interval between second-to-third pulses, and long for the interval between third-to-fourth interval.

(3) A time interval $T_1$ from the trigger signal to the first strobe pulse is controlled.

(4) The interval between the strobe pulses is gradually shortened as the strobe pulse changes from the first one to the subsequent one. Namely, the interval between the strobe pulses changes from coarse to fine.

The reason for the control (1) is because the motor rotation speed gradually increases during the four excitation pulses as shown in FIG. 3. However, in the control in which more than four excitation pulses are generated for each trigger pulse, the rotation of the motor shifts from an acceleration mode to a constant speed mode and the current of the excitation pulse is to be kept constant in the constant speed mode.

The reason for the control (2) is as follows. In the control where four excitation pulses are generated for each trigger pulse, the paper feed amount tends to be delayed for the first excitation pulse. The amount of delay gradually increases. When the motor is accelerated and the motor rotation speed increases, the amount of delay is restored and finally exceeds a normal amount. Namely, the amount of delay changes:

Small→large→small→beyond normal

In the control (2), the interval between the excitation pulses is short for the interval between first-to-second pulses, normal for the interval between second-to-third pulses and long for the third-to-fourth pulses by taking the change of amount of delay into consideration.

The control (3) is done by taking into consideration of the effect by the previous trigger pulse to the rotation of the motor. If the next trigger pulse is applied before the previous rotation has not completely stopped, the amount of delay must be small. FIG. 3 shows a relationship between a time interval $T_1$ from the trigger pulse to the first strobe pulse and a time interval $T_2$ from the last excitation pulse by the previous trigger to the next trigger.

Figure 4:
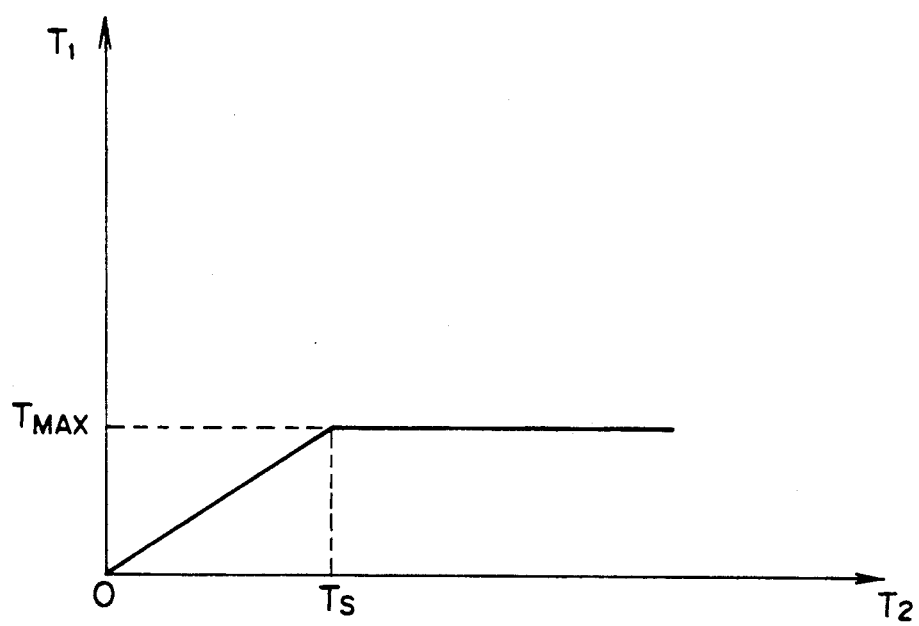
FIG. 4 shows a relationship between $T_1$ and $T_2$ shown in FIG. 3.

When $T_2$ is zero (the excitation pulses are successively generated at a predetermined interval), it means the continuous rotation and there must be no delay. Accordingly, $T_1$ is substantially zero. As $T_2$ becomes longer, $T_1$ increases. In FIG. 4, $T_1$ is kept constant at $T_x$ because the motor is stopped when the time $T_x$ has elapsed after the last excitation pulse by the previous trigger was issued. Accordingly, so long as $$T_2 \equiv T$$

the motor is started from the stop state and the delay $T_1$ of the strobe is kept at $T_{max}$.

The control (4) is done by the same reason for the control (1). Since the motor rotation speed gradually increases during the four excitation pulse period, the interval of strobe generation is rendered gradually dense. However, like in the control (1), if the control is such that more than four excitation pulses are generated for each trigger pulse, the motor rotation shifts from the acceleration mode to the constant speed mode, and the interval of the strobe generation is kept constant in the constant speed mode.

According to experiments by the inventors, it has been proved that there was no practical problem with only the controls (1) and (2). A uniform rotation speed was attained and a high recording quality was attained. By adding the controls (3) and (4), higher quality of recording was attained.

A modification is now explained. In the above embodiment, the control to the recording motor and the strobe is changed in accordance with the interval $T_2$ from the previous trigger to the next trigger, and the timing $T_1$ of the phase excitation is changed only when the interval exceeds a certain value ($T_x$ in FIG. 5). However, in an actual recording apparatus, if a period in which $T_2$ exceeds the certain value is longer than a period in which $T_2$ does not exceed the certain value, $T_2$ may not be counted and the timing of the phase excitation for all triggers may be controlled in the manner described in the above embodiment to attain a similar effect to that of the above embodiment.

Figure 5:
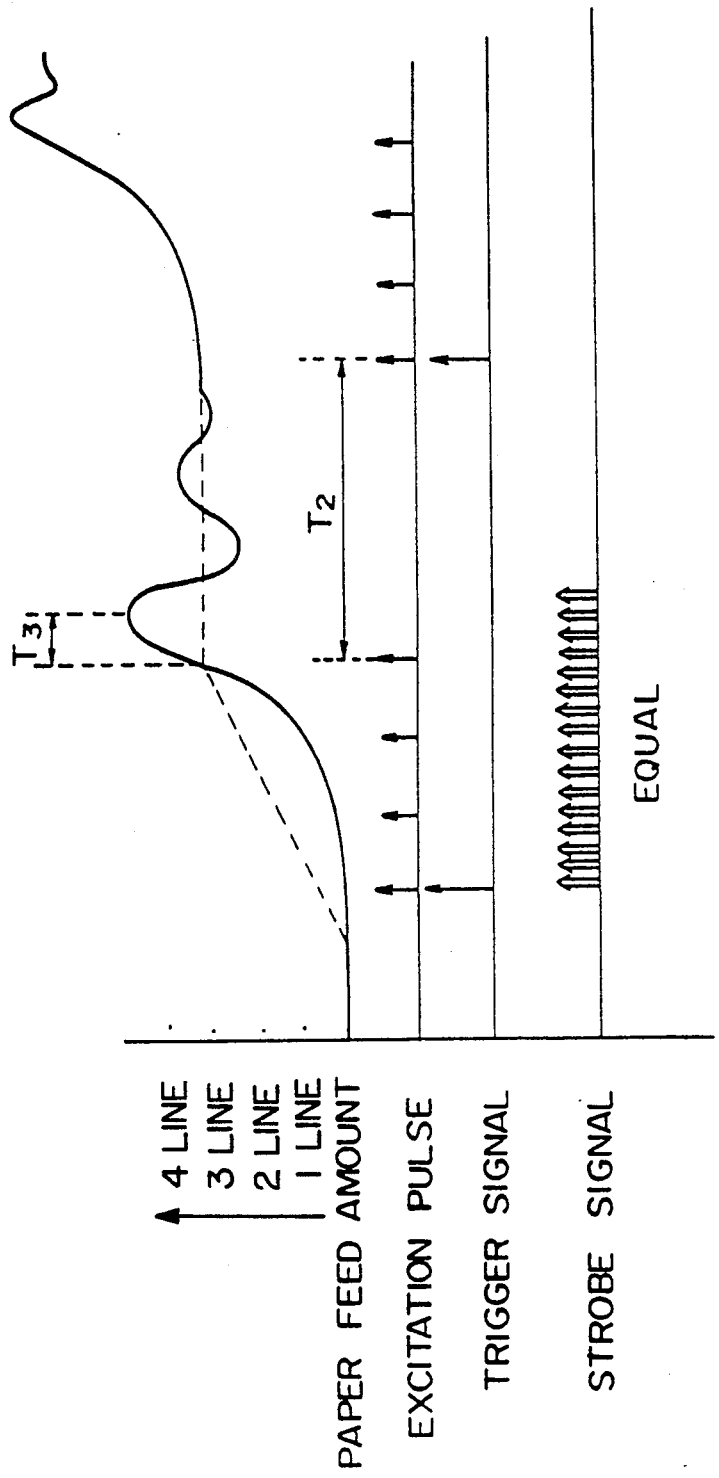
FIG. 5 shows a timing chart for a prior art recorder.

For the control (3), the following manner may be used. In FIG. 5, if a time period $T_3$ from the overshoot of the motor rotation angle to the undershoot is $$T_2 \equiv T_3$$

the motor is almost stopped or in the undershoot state when a new trigger pulse is issued. In such a case, there is a risk that the record line density becomes uniform and hence the time period $T_1$ is rendered long.

In the above embodiment, the control to the generation timing of the excitation pulses and the strobe pulses is readily attained by using a timer.

In accordance with the present invention, the closer to the time when the motor starts to rotate that the exciting pulses of the stepping motor are, the larger are the currents thereto. Since the closer to the start timing it is, the larger is the rotation torque required, the constant current status is reached earlier. Further, the closer to the start timing the exciting pulses are, the shorter is the pulse generation interval. Since the closer to the start timing it is, the larger is a paper feed delay rate relative to the excitation pulse, the delay is compensated by shortening the pulse generation interval more for those excitation pulses which are closer to the start timing. Further, the longer the time period from the end of the previous excitation to the motor to the next excitation is, the longer is the delay time from the first excitation pulses applied to the motor to the recording of the first dot along the paper feed direction. The longer the time period from the end of the previous excitation to the next excitation is, the closer to the stop state is the motor. Accordingly, if the delay time before the recording of the first dot is set longer by this control, the beginning period of the start in which the paper feed speed is low is taken off from the recording.

What is claimed is:

1. A paper feed control system for a recorder comprising:
   a paper feed stepping motor;
   a driver for driving said stepping motor; and
   control means responsive to a drive trigger for generating a plurality of consecutive excitation pulses and applying those pulses to said driver in order, the control means generating each of said plurality of consecutive excitation pulses at increasing time intervals.

2. A paper feed control system according to claim 1 wherein said control means applies the excitation pulses in such a manner that the closer the excitation pulses are to the first generated pulse, the larger an excitation current will be.

3. A paper feed control system according to claim 2 wherein said control means applies the excitation pulses in such a manner that the closer the excitation pulse is to the pulse to be generated last, the smaller the current will be.

4. A paper feed control system according to claim 3 wherein said control means applies the excitation pulses in such a manner that the closer the excitation pulse is to the pulse to be generated last, the longer the generation interval will be.

5. A recording control system for a recorder comprising:

a stepping motor for feeding a record sheet:
a driver for driving said stepping motor:
print means for printing data on the record sheet fed by said stepping motor, said print means printing data in response to receipt of strobe signals: and
control means for generating a plurality of consecutive excitation signals and a plurality of consecutive strobe signals and for applying said excitation signals to said driver and said strobe signals to said print means, said control means delaying generation of a first one of the strobe signals more than it delays generation of a first one of the excitation signals.

6. A recording control system according to claim 5 wherein the delay time of the strobe signals by said control means is determined by a time interval from the end of the previous excitation to the motor to the next excitation.

7. A recording control system according to claim 6 wherein said delay time is zero when the time interval is short.

8. A recording control system according to claim 6 wherein said delay time is constant when the time interval is long.

9. A recording control system according to claim 5, wherein the control means differentiates generating intervals of the strobe signals so that a first interval may be longer.

* * * * *